United States Patent [19]

Lebet et al.

[11] 4,003,774

[45] Jan. 18, 1977

[54] STABILIZATION OF TOWS OF FILAMENTARY MATERIAL

[75] Inventors: Jean-Pierre Lebet, Montreux; Jöel Daniel Ducommun, Chavannes, both of Switzerland

[73] Assignee: Baumgartner Papiers S.A., Switzerland

[22] Filed: Sept. 20, 1974

[21] Appl. No.: 507,804

[30] Foreign Application Priority Data

Sept. 24, 1973 Switzerland .................... 13675/73

[52] U.S. Cl. .............................. 156/180; 28/1 HF; 131/267; 156/274; 156/441; 156/380; 156/543; 219/10.53; 219/10.81; 219/10.69

[51] Int. Cl.[2] ........................ B29H 9/02; B04H 3/08

[58] Field of Search ................. 156/62.2, 294, 180, 156/323, 380, 273, 381, 283, 441, 289, 543, 296, 166, 433, 274, 272; 219/10.53, 10.69, 1.81; 93/1 C, 77 FT; 425/DIG. 55, 174, 174.8; 264/22, 25; 131/261 R, 268, 264, 269, 267; 428/373, 398; 19/65 T; 28/1 CF, 1 HF

[56] References Cited

UNITED STATES PATENTS

| | | | |
|---|---|---|---|
| 1,900,573 | 3/1933 | MacArthur | 28/1 HF |
| 2,438,155 | 3/1948 | Diller | 219/10.81 |
| 2,608,637 | 8/1952 | Dakin et al. | 425/174.8 |
| 3,106,501 | 10/1963 | Cobb et al. | 156/180 |
| 3,202,493 | 8/1965 | Heil | 156/320 |
| 3,297,512 | 1/1967 | Cobb et al. | 156/441 |
| 3,435,534 | 4/1969 | Knobloch et al. | 28/1 HF |
| 3,516,885 | 6/1970 | Sexstone et al. | 156/274 |
| 3,819,435 | 6/1974 | Roberts et al. | 156/62.2 |
| 3,864,183 | 2/1975 | Hori | 156/27 Y |

OTHER PUBLICATIONS

Modern Plastics Encyclopedia, vol. 498, No. 10A, pp. 46 and 48, (10–1972).

*Primary Examiner*—William A. Powell
*Assistant Examiner*—J. J. Gallagher
*Attorney, Agent, or Firm*—Robert E. Burns; Emmanuel J. Lobato; Bruce L. Adams

[57] ABSTRACT

A tow of filamentary dielectric material, wrapped in a flexible conveyor belt of low permittivity material such as PTFE, is passed through a stationary tube also of low permittivity material. This tube is disposed in resonating cavities wherein a high frequency electric field of $3.10^8$ to $3.10^{11}$Hz heats the tow. After cooling, the tow forms a tube which may be cut to form cigarette filters.

9 Claims, 2 Drawing Figures

STABILIZATION OF TOWS OF FILAMENTARY MATERIAL

Figure 1:
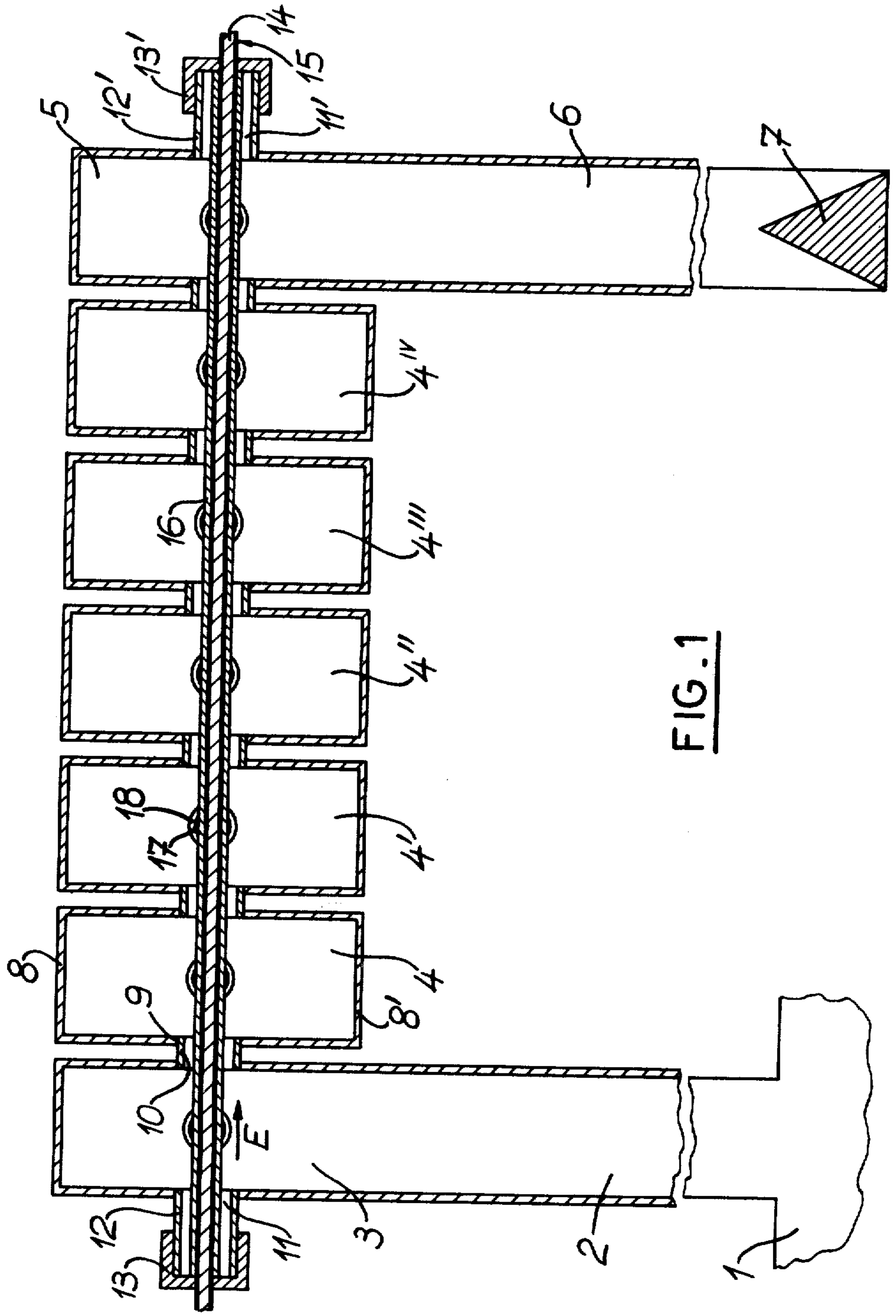

The invention relates to the stabilization of tows of filamentary material, to produce an elongate member in the form of a rod which may for example be cut into sections for use as cigarette filters which do not require a paper envelope.

In a known process, described for example in U.S. Pat. No. 3,377,220, before uniting fibrous filaments into a tow, a heat activable binder is dispersed therebetween. Then the tow is passed through a tube having lateral inlet and outlet orifices. At a first location steam is passed through these orifices and through the tow to melt the binder, and the tow is squeezed to a given diameter to form a more coherent outer layer of filaments and so that the softened particles of binder join the filaments. Then, at a second location, cooling air is passed through the orifices to solidify the binder and provide a dimensionally stable elongate member in the form of a rod.

This known process is satisfactory, but the penetration of the tow by steam and air requires an appreciable time which limits the speed of formation of the rod and consequently the productivity of the installation.

The invention aims to improve the speed of heating of the tow in such a process.

The invention therefore provides a process of stabilizing a tow of filamentary dielectric material, wherein the tow is heated in an electric field having a frequency between $3.10^8$ and $3.10^{11}$ Hz.

This process preferably involves wrapping the tow in a flexible belt of low permittivity material, and passing the belt and the tow through a stationary tube of low permittivity material in said electric field along a direction at least substantially parallel to the direction of said field.

The term "low permittivity" as used herein means a permittivity lower than that of the material of the tow, preferably many times lower.

The invention also concerns an apparatus for stabilizing a tow of filamentary dielectric material, comprising an elongated tube of low permittivity material disposed in at least one resonating cavity, a flexible endless conveyor belt of low permittivity material passing through the tube, means for delivering a tow of filamentary dielectric material onto the conveyor belt for conveyance thereof through the tube wrapped in the belt, and means for applying an electric field having a frequency between $3.10^8$ and $3.10^{11}$ Hz to said at least one cavity with said field directed at least substantially parallel to the direction of passage of the tow along the tube to heat the tow during passage along the tube.

The invention also pertains to stabilized elongate members produced by the process, and cigarette filters cut from such elongate members.

As the heat treatment provided according to the invention acts simultaneously through all of the section of the part of the tow exposed to the micro-waves, and allows the application of relatively high energy radiation, it ensures an almost instantaneous heating of the entire mass of said part of the tow and because of this enables a considerable increase in productivity.

Apart from this, the heat produced may be strongly concentrated and localized on the product to be heated, whereby the overall installation can remain relatively cool.

Figure 2:
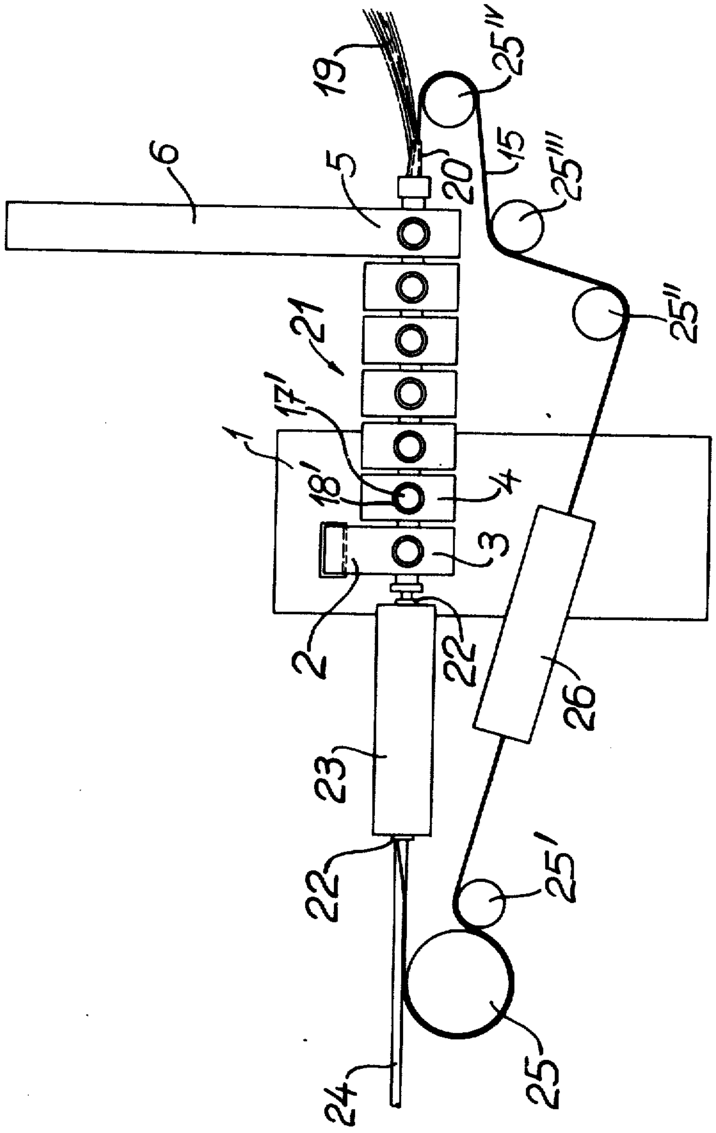

The accompanying drawings show, schematically and by way of example, an embodiment of the apparatus according to the invention. In the drawings:

FIG. 1 is an axial cross-section through a series of resonating cavity elements forming a micro-wave applicator; and FIG. 2 is an overall view of the apparatus.

The heating device of the apparatus includes a high frequency generator 1 transmitting hyper-frequency energy to a wave-guide 2, i.e. at a frequency between $3.10^8$ and $3.10^{11}$Hz. The guide 2 forms an inlet guide coupled with a first resonating cavity element 3 of the applicator (FIG. 1).

To the first resonating cavity element 3 are coupled, in series, five identical resonating cavity elements 4 to $4^{IV}$; the cavity of the first of these elements 4 being coupled to the cavity of the inlet element 3 and that of the last element $4^{IV}$ is coupled to the cavity of an outlet element 5. The cavity of the outlet element 5 is itself coupled to an outlet wave-guide 6 in the same manner as the cavity of the inlet element 3 is coupled to inlet guide 2. The outlet wave-guide 6 terminates with a load impedance 7 absorbing the energy not used by the high frequency heating. The generator 1, wave-guide 2, and cavities jointly comprise means for developing a spatially contained electric field.

The resonating cavity elements 4 to $4^{IV}$ are formed by rectangular wave-guide elements short-circuited at their two ends by metal walls 8 and 8' or by other appropriate metal elements.

The electrical coupling between the various cavities is provided by means of circular orifices 9 provided in the middle of the larger faces of the elements, the two adjacent orifices of each pair of neighbouring elements being connected by a short metallic sleeve 10 welded at either end. The sleeves 10 jointly comprise means for coupling the cavities in series.

The cavities of the end elements, inlet 3 and outlet 5, include, on their larger outer face non-coupled to the adjacent element 4 and $4^{IV}$, a respective opening 11 and 11' along the axis of sleeves 10. These openings are extended outwardly by metal covers 13 and 13' having a central aperture allowing free passage of a tow 14 and a conveyor belt 15 described further on, and of such dimension that energy losses to the exterior are negligible.

A tube 16, through which the tow 14 to be heated passes wrapped in the conveyor belt 15, passes through the various resonating cavities and their connecting sleeves.

The shift of the resonant frequency of the cavities, produced by manufacturing tolerances, by the dielectric properties of the endless conveyor belt 15, and by the effective value of the dielectric constant of the tow 14 passing through the cavities, is compensated. This is achieved by adjusting the resonant frequency of each cavity by setting the position of two bars (one of which, 17, is shown in FIG. 1 and the other 17', opposite to the first, is shown in FIG. 2) of dielectric material with low losses, these bars penetrating into each cavity. The bars 17, 17' are each movable axially along a metal tube 18, 18' respectively which are disposed transverse to and on either side of the tow 14, and pass through the centres of lateral faces of the cavity disposed parallel to the tow 14.

The electric component E of the electromagnetically produced field is, due to the orientation of the cavities and the mode of provision of their electrical coupling, parallel to the axis of the tube 16 and remains constant all the way along its passage in a cavity. As, moreover, the tube 16 passes through the centre of the cavities 3, 4 to 4$^{IV}$ and 5, it is located in a maximum electric field at any point of its passage in each cavity and is thus submitted to a maximum heating.

Heating of the tow 14 increases upon passage in each successive cavity while the hyper frequency energy reduces as the distance from the generator 1 increases. The remainder of this energy is absorbed by the load impedance 7.

The cavities may have other shapes and be mutually coupled in another manner.

The tube 16 of the heating device consists of a material of very low permittivity to absorb the minimum energy, for example polytetrafluorethylene such as that available under the Trade Names Teflon and Hostalon, or of quartz.

Through this tube 16 passes the tow 14 which must be heated so as to acquire the desired stability of shape. The tube 16 preserves the tow 14 from a possible deformation produced by the energetic heating it undergoes.

The tow 14 is formed initially of filaments disposed in a band which is provided with particles of a heat-activable binder and then brought together as indicated at 19 (FIG. 2), and directed into a funnel 20 in which endless conveyor belt 15 also enters, the latter being bent by the funnel 20 into the form of a hollow cylinder wrapped around the tow 14. Then the belt 15 with tow 14 enters into the previously described applicator 21 with several resonating cavity elements, the hyperfrequency energy being conducted from the generator 1 to the applicator 21 by wave-guide 2. At the outlet of the applicator 21, the tow 14 and belt 15 enter another tube 22 which leads them through a cooling device 23 in which cooling air circulates and in which the tow 14 is transformed into a rod 24 which upon leaving the cooling device is brought into a device, not shown, which cuts it into sections of the desired length for use as cigarette filters.

The conveyor belt 15 unfolds, after having left the tube 22 of the cooling device 23, to reassume its flat shape and to be returned by a set of pullies 25 to 25$^{IV}$ towards the funnel 20 so as to continuously repeat the same cycle. Belt 15 also consists of a material with low permittivity for example polytetrafluorethylene preferably reinforced by glass fibres, for example that available under the Trade Name Fluorglas, or is formed by a fabric of nylon threads such as is available under the Trade Name Nomex.

The conveyor belt 15, although it is not substantially heated itself directly by the microwaves upon passing through the cavities, is nevertheless heated by the heat transmitted to it by the tow 14 that it encloses. It is thus preferably additionally cooled by at least one appropriate cooling device 26 through which it passes on its path between the outlet of the tow cooling device 23 and the inlet of funnel 20.

The endless conveyor belt 15 may be formed by a single belt of an appropriate length whose ends are joined together by sticking for example after one of the ends has been passed through tubes 16 and 22. Another possibility consists of providing these tubes with a slot by which the endless belt can be inserted therein. It is also possible to give the tubes 16 and 22 an inner diameter such that the endless belt enclosing the tow may penetrate doubled, forming two hollow cylinders disposed in one another; the endless belt is thus introduced into these tubes with its two runs placed side-by-side. Pulleys at the two ends of the device enable the two runs of the belt to pass through the tubes simultaneously in opposite directions, this arrangement being made possible by the very low coefficient of friction of the belt, with itself and with the inner tube, which are for example both of polytetrafluorethylene.

What is claimed is:

1. A process of stabilizing a tow of filamentary dielectric material, comprising:

a. providing a tow of filamentary dielectric material, and a plurality of resonant cavities coupled in series to transfer electromagnetic energy therebetween, and each having a pair of opposed apertures for providing communication between the interior and the exterior thereof, said plurality of cavities being aligned with their respective apertures along a common straight line to define in use a path of travel for the tow of filamentary dielectric material, and wherein each of said cavities includes means for adjusting the resonant frequency thereof to a common frequency between about $3 \times 10^8$ and $3 \times 10^{11}$ Hertz;

b. developing a spatially contained electric field within said plurality of resonant cavities and oriented substantially parallel to the straight line defining the path of advance of the tow, and having a frequency between about $3 \times 10^8$ and about $3 \times 10^{11}$ Hertz;

c. advancing the tow through the plurality of cavities through the spatially contained electric field contained the rein, along a direction parallel to the field and along the straight line along which the apertures are aligned to effect sufficient dielectric heating within the tow to thermally fuse dielectric filaments within the tow; and d. simultaneously supporting the tow along an entire portion thereof within the spatially contained electric field contained within the plurality of cavities as the tow is being advanced therethrough and heated, to prevent deformation of the heated portion of the tow.

2. An apparatus for stabilizing a tow of filamentary dielectric material, comprising:

a. a plurality of resonant cavities in series, each of said cavities including means for adjusting the resonate frequency thereof to a common frequency between about $3 \times 10^8$ and $3 \times 10^{11}$ Hertz, and each of said cavities having a pair of opposed apertures for providing communication between the interior and the exterior thereof, said plurality of cavities aligned with their respective apertures along a common straight line to define in use a path of travel, for a tow of filamentary dielectric material, through the plurality of series connected cavities;

b. means for coupling said cavities in series to transfer electromagnetic energy therebetween;

c. means for developing a spatially contained electric field having a frequency between about $3 \times 10^8$ and about $3 \times 10^{11}$ Hertz within said cavities and substantially parallel to the path of advance of the tow;

d. means for advancing a tow of filamentary dielectric material through the spatially contained electric field, contained within said plurality of cavities, in a direction parallel to the field and along the straight line along which said apertures are disposed to effect sufficient dielectric heating within the tow to thermally fuse dielectric filaments within the tow; and e. means for simultaneously supporting the tow along the entire portion thereof within the spatially contained electric field within said cavities as the tow is being advanced therethrough and heated, to prevent deformation of the heated portion of the tow.

3. An apparatus for stabilizing a tow of filamentary dielectric material, comprising:

a. a plurality of resonant cavities in series, each of said cavities including means for adjusting the resonant frequency to a common frequency between about $3 \times 10^8$ and $3 \times 10^{11}$ Hertz, and each of said cavities having a pair of opposed apertures for providing communication between the interior and exterior thereof, said plurality of cavities aligned with their respective apertures along a common straight line to define in use a path of travel, for a tow of filamentary dielectric material, through the plurality of series connected cavities;

b. means for coupling said cavities in series to transfer electromagnetic energy therebetween;

c. an elongated tube disposed extending through the plurality of aligned apertures for supporting the tow as it is advanced in use through the plurality of series connected cavities, said elongated tube comprised of a low permittivity material to prevent heating by electromagnetic energy within said cavities;

d. a driven flexible endless conveyor belt of low permittivity material having a portion disposed through said elongated tube, and which advances through said elongated tube when driven;

e. drive means for driving said flexible endless conveyor to advance it through said elongated tube;

f. means receptive in use of a tow of filamentary dielectric material and coactive with a portion of said endless conveyor belt for wrapping the tow of filamentary dielectric material in said conveyor belt as said belt is driven, whereby the tow of filamentary dielectric material wrapped in said endless conveyor belt is advanced through said elongated tube; and g. means for developing an electric field having a frequency between about $3 \times 10^8$ and about $3 \times 10^{11}$ Hertz within said cavities and substantially parallel to the path of advance of the tow wrapped in said endless conveyor belt to effect dielectric heating within the tow in use as it is advanced by said drive means through said elongated tube.

4. An apparatus according to claim 3, in which the tube is of polytetrafluorethylene.

5. An apparatus according to claim 3, in which the tube is of quartz.

6. An apparatus according to claim 3, in which the conveyor belt is of polytetrafluorethylene.

7. An apparatus according to claim 3, in which the conveyor belt is a fabric of low permittivity material.

8. An apparatus according to claim 3, in which the conveyor belt is of polytetrafluorethylene reinforced with glass fibres.

9. An apparatus according to claim 3, comprising means for cooling the conveyor belt.

* * * * *